April 17, 1945.   D. BUNEVICH   2,374,075
AEROPLANE
Filed March 3, 1943   6 Sheets-Sheet 1
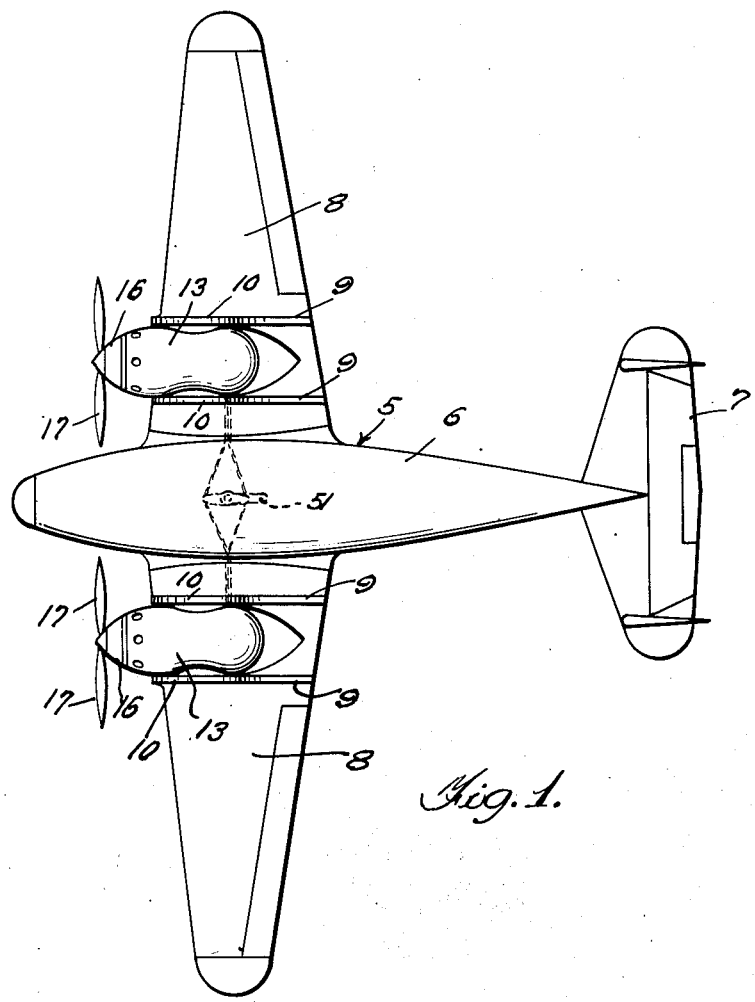
Fig. 1.
Fig. 2.
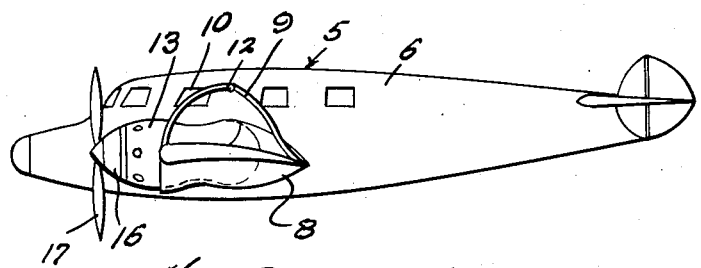

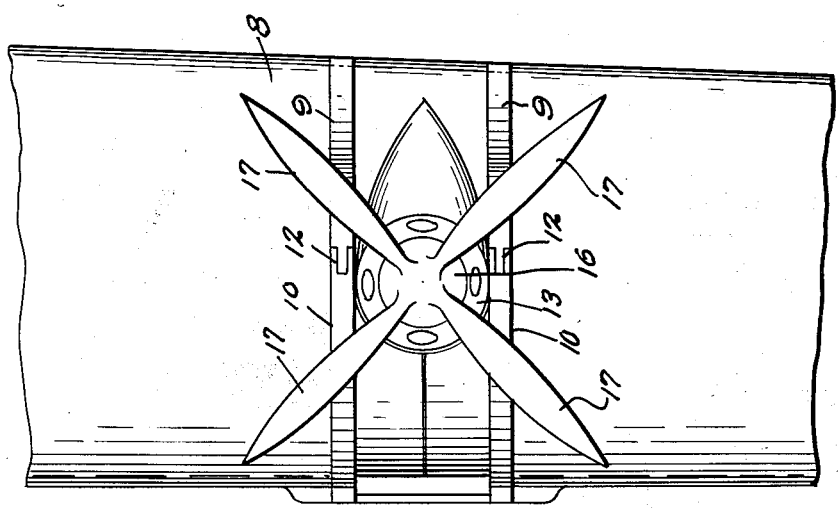
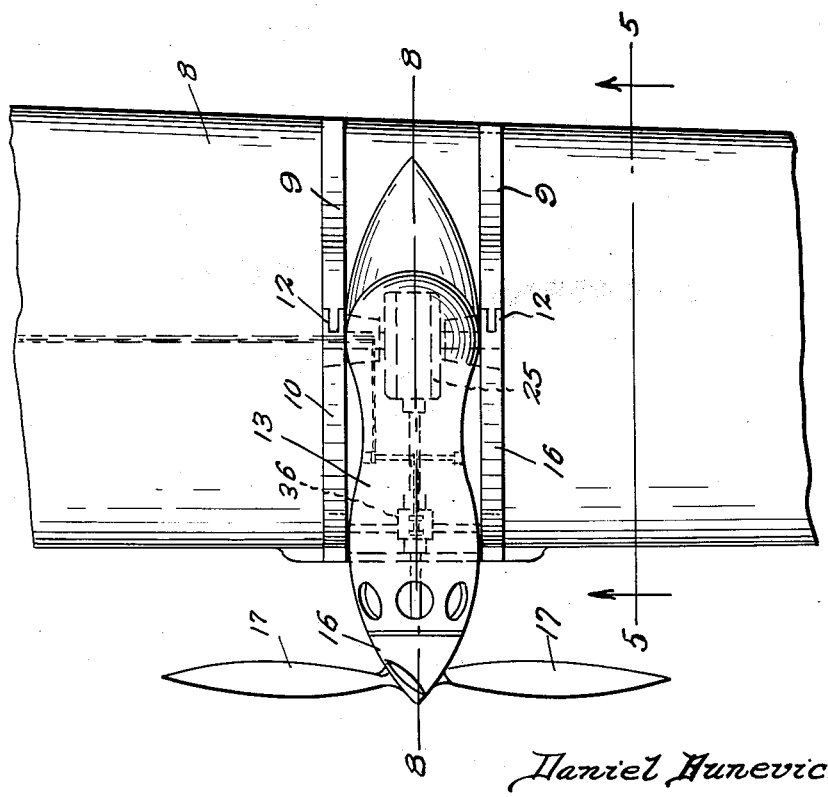

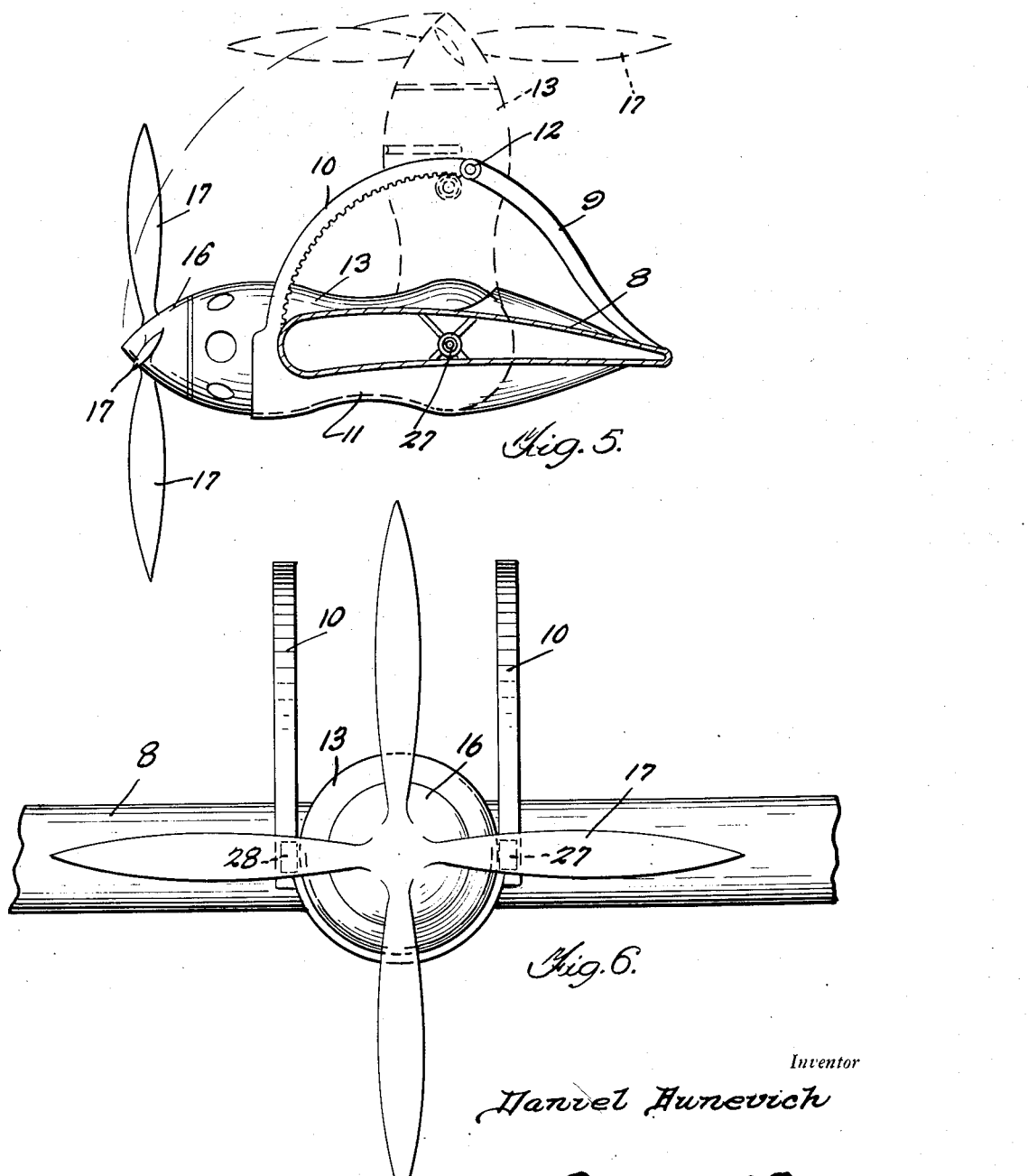

April 17, 1945.　　　D. BUNEVICH　　　2,374,075
AEROPLANE
Filed March 3, 1943　　　6 Sheets-Sheet 4

Inventor
Daniel Bunevich
By Clarence A. O'Brien
and Harvey B. Jacobson
Attorneys April 17, 1945. D. BUNEVICH 2,374,075
AEROPLANE
Filed March 3, 1943 6 Sheets-Sheet 5

Inventor
Daniel Bunevich
By Clarence A. O'Brien
and Harvey B. Jacobson
Attorneys April 17, 1945.  D. BUNEVICH  2,374,075
AEROPLANE
Filed March 3, 1943  6 Sheets-Sheet 6
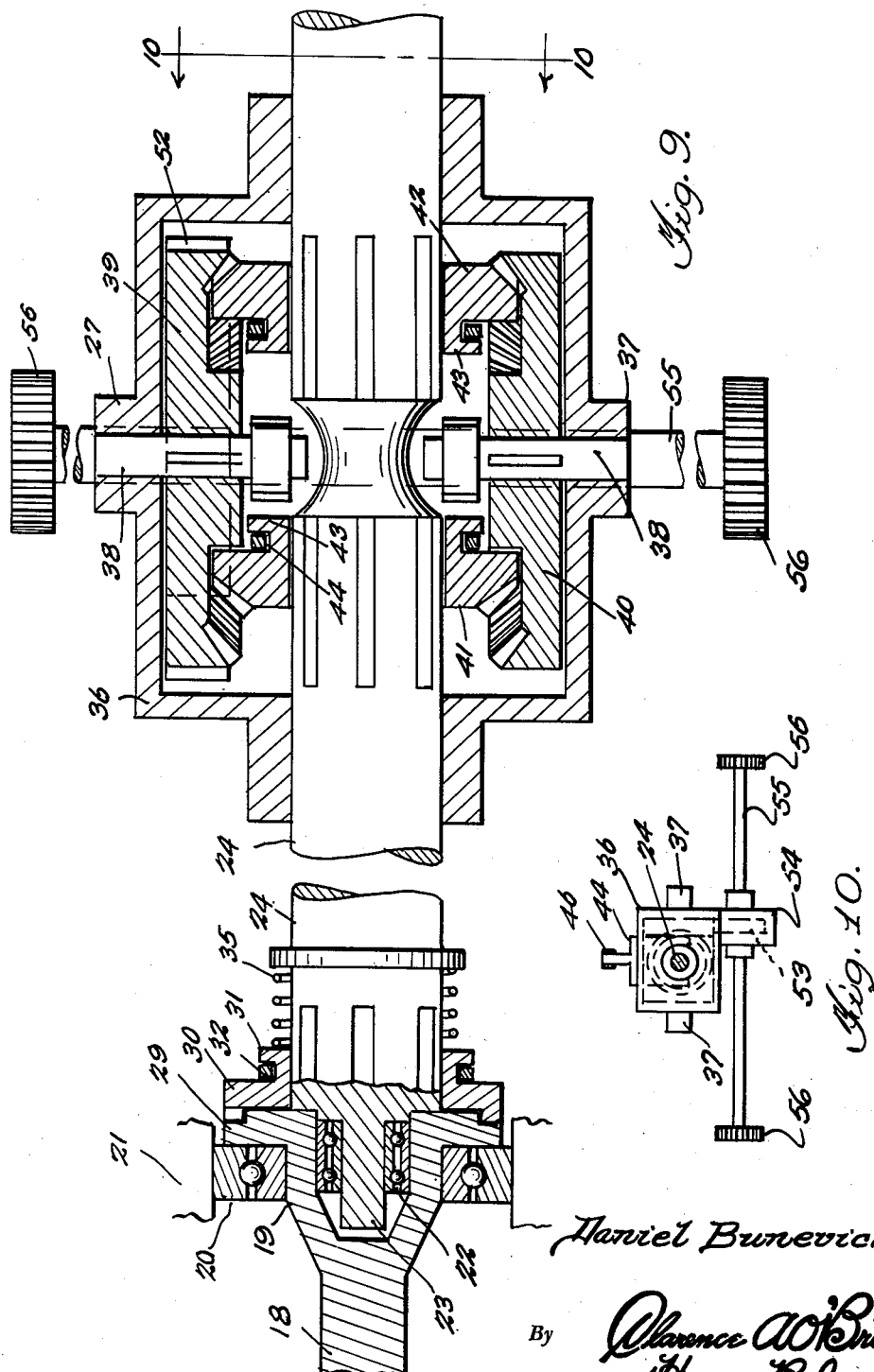
Inventor
Daniel Bunevich
By Clarence A. O'Brien
and Harvey B. Jacobson
Attorneys Patented Apr. 17, 1945

2,374,075

UNITED STATES PATENT OFFICE 2,374,075

AIRPLANE

Daniel Bunevich, West Allis, Wis.

Application March 3, 1943, Serial No. 477,858

3 Claims. (Cl. 244—56)

This invention relates to new and useful improvements in aircraft and more particularly to an airplane adapted for vertical take-off and landing.

An important object of the invention is to provide an aircraft having wing supported propelling motors wherein the propellers and motors can be swung on vertical arcs to permit take-offs and landings in very small areas.

Another important object of the invention is to provide an aircraft of this character which will permit the installation of airports closer to the centers of large populated communities.

Various other important objects and advantages of the invention will become apparent to the reader of the following description.

In the drawings:

Figure 1 is a top plan view of the airplane.

Figure 2 is a side elevational view.

Figure 3 is a fragmentary top plan view of one wing of the airplane with the propulsion unit in horizontal position.

Figure 4 is a fragmentary top plan view of a wing showing the propulsion unit in vertical position.

Figure 5 is a section taken substantially on the line 5—5 of Figure 3, and showing in broken lines the propulsion unit in upright position.

Figure 6 is a fragmentary front elevational view of the structure as shown in Figure 3.

Figure 9 is a fragmentary horizontal sectional view through the transmission mechanism.

Figure 10 is a reduced transverse sectional view taken substantially on the line 10—10 of Figure 9.

Figure 7:
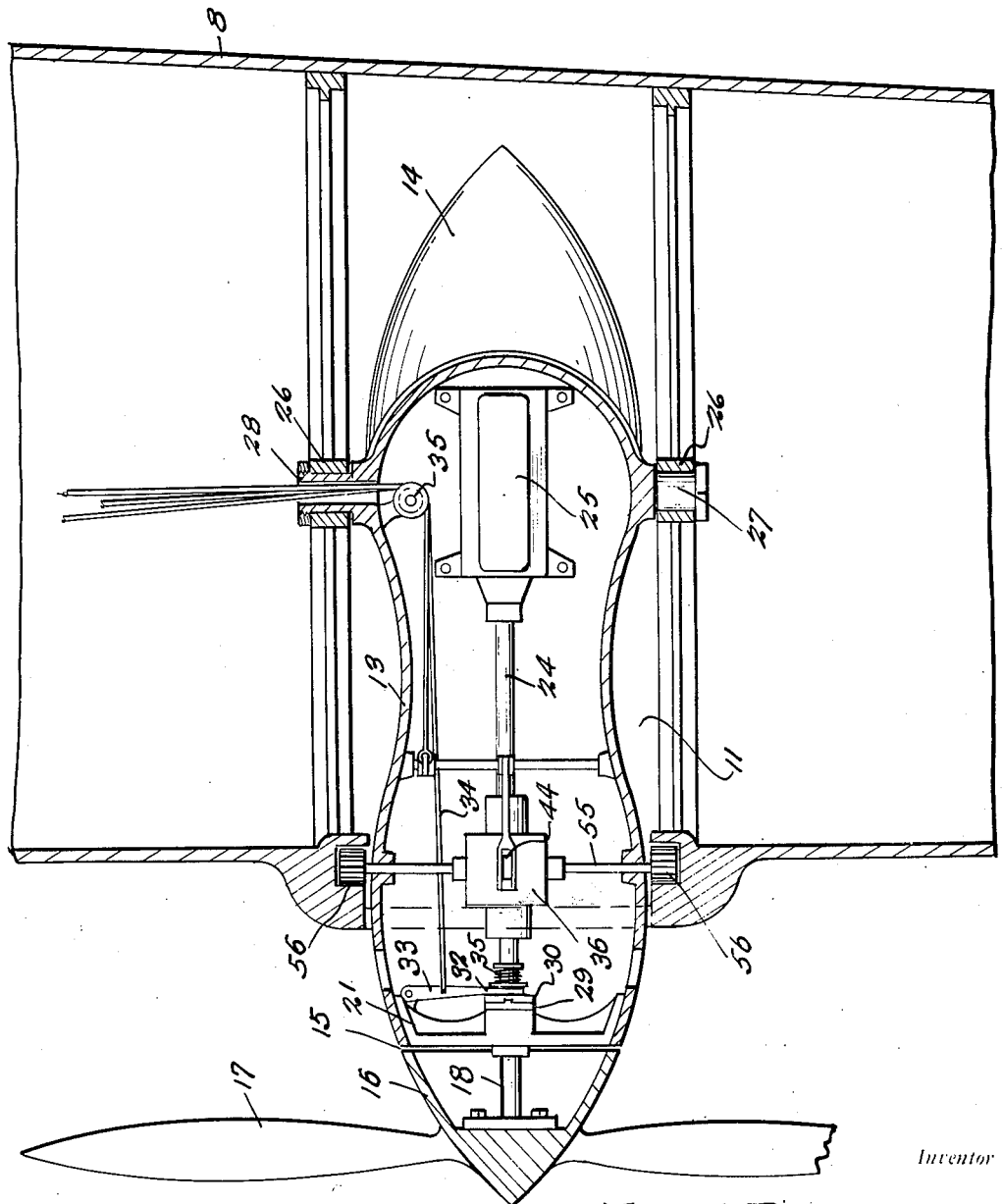
Figure 7 is an enlarged fragmentary horizontal sectional view through the wing and propulsion unit.
Figure 8:
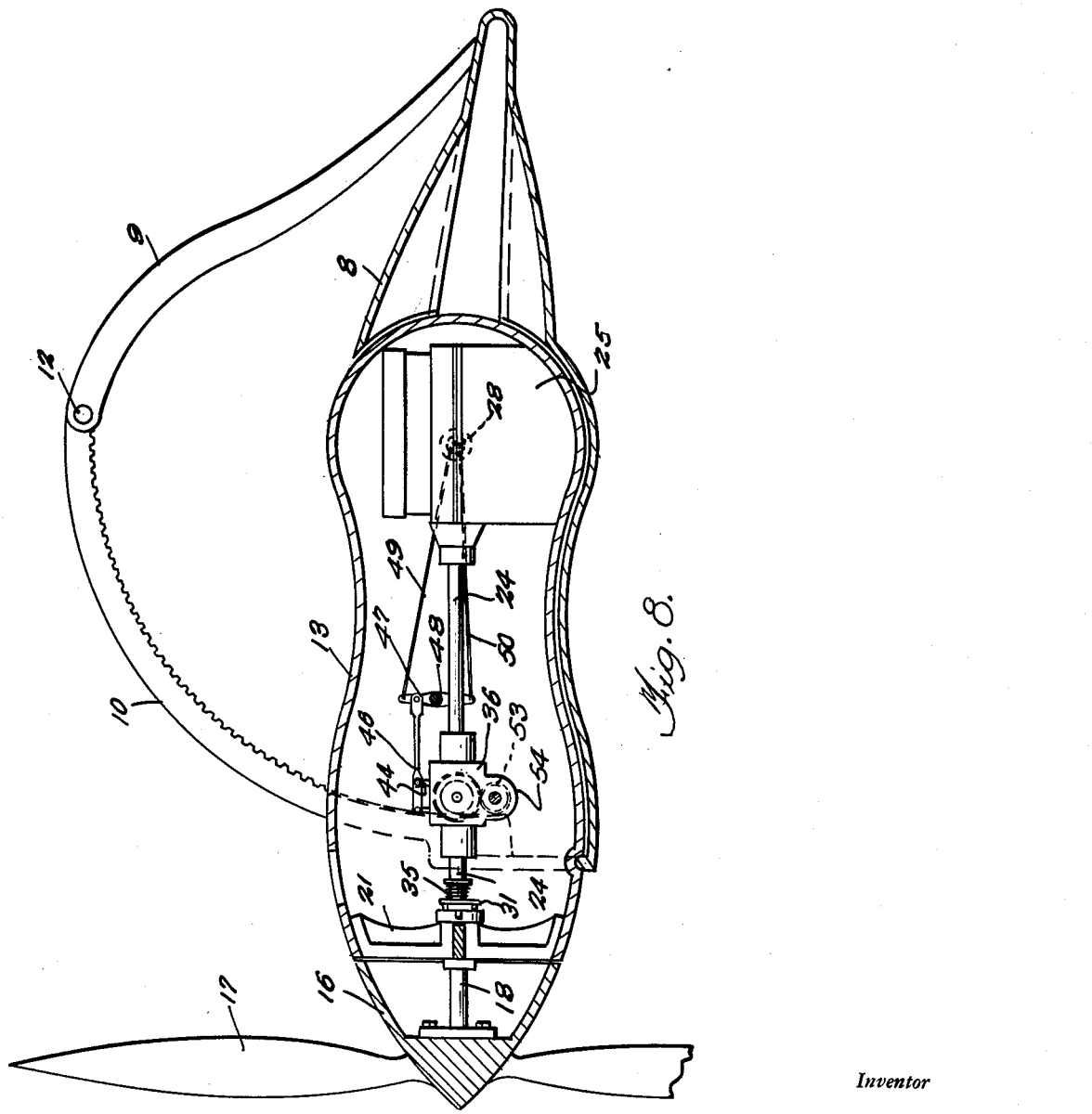
Figure 8 is an enlarged vertical sectional view taken substantially on the line 8—8 of Figure 3.

Referring to the drawings wherein like numerals designate like parts, it can be seen that numeral 5 (see Figure 1) denotes the improved aircraft which briefly is composed of the conventional parts, the fuselage 6, tail assembly 7 and wings 8, 8.

In carrying out the present invention, and depending upon the number of propulsion units intended to be used, each propulsion unit consists of a pair of arcuate bars 9, 9 (see Figure 3) extending forwardly over the corresponding wing 8 in spaced parallel relation from the trailing edge of the wing to each meet an arcuate rack 10 extending upwardly and rearwardly over the wing from a cradle structure 11 which partly underlies the corresponding wing 8. The racks 10 and bars 9 meet and are joined together as at 12.

The front of the cradle 11 is open while the rear portion is closed.

Numeral 13 denotes an elongated streamlined shell having a bullet nose-shaped rear end 14. The forward end of the shell 13 is cut off bluntly as at 15, but has its outside surface flush with the outside surface of a bullet-shaped hub structure 16 from which propeller blades 17 project. The hub 16 is supported by a shaft 18 which as shown in Figure 9 is enlarged as at 19 and disposed into a bearing 20 supported by a suitable structure 21 within the forward portion of the shell 13. The enlarged portion 19 of the shaft 18 is hollow and has a bearing 22 therein receiving a reduced portion 23 of the forward end portion of a drive shaft 24 which extends from a power plant 25 located in the rear portion of the shell 13.

As can be seen in Figure 7, the wing 8 underlying the upper ends of the racks 10, 10 is provided with bearings 26, 26 into which project trunnions 27, 28 from the rear portion of the shell 13, the trunnion 28 having an opening therethrough.

A clutch is provided between the shaft section 18 and the drive shaft 24, this clutch comprising a clutch plate 29 located on the rear end of the shaft 18, and a slide clutch plate 30 having a grooved shoulder 31 into which engages a fork 32 located on a swingable arm 33, this arm being controlled by a pull cable 34 extending over a pulley 35 and passing through the hollow trunnion 28 to a control element (not shown) in the cabin of the fuselage 6.

A spring 35 on the forward end of the shaft 24 serves to urge the clutch plate 30 into clutch engagement with the clutch plate 29 on the shaft 18. Obviously, whenever it is desired to disconnect the propeller from the motor 25 and yet permit elevation of the entire unit, the clutch just described can be disconnected.

The geared transmission for elevating and lowering the propulsion unit consists of a case 36 having the shaft 24 extending therethrough. Bearings 37, 37 are provided in the sides of this case 36 and through the same are disposed stub shafts 38, 38 the same having beveled gears 39, 40 at their ends within the case 36. These beveled gears 39, 40 are adapted to be engaged by beveled slide gears 41, 42, each of which has a grooved shoulder 43 for receiving portions of a forked structure 44 depending from a slide member 46 connected to a rocker 47 located on a shaft 48. Control cables 49, 50 extend from the upper and lower ends of the rocker 47 and pass through the hollow trunnion 28 to a suitable control 51 located in the cabin of the fuselage 8.

The beveled gear 40 idles, while the beveled gear 39 has peripheral teeth 52 which mesh with an underlying gear 53 located in a housing 54, the gear 53 being located on a transverse shaft 55 having gears 56 at its ends. The ends of the shaft 55 project out beyond the sides of the shell 13 and the gears 56 mesh with the teeth of the rack bars 10, 10.

Obviously, when the power plant 25 is in operation and either one of the beveled gears 41, 42 is in mesh with the gears 39, 40, the unit will be moved upwardly or downwardly. When the unit is in the elevated position as shown in Figure 4 and as shown in broken lines in Figure 5, the plane can take off from a standing position and can land in substantially a vertical line.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In an airplane having wings, a propulsion unit mounted on each wing and means for swinging the propulsion unit from a horizontal plane to substantially vertical plane, said means including a pair of arcuate toothed tracks arching upwardly over each wing in spaced-apart parallel relation in each pair and gears carried by each unit and driven thereby, said gears meshing in pairs with the pairs of toothed tracks.

2. In an aircraft having a wing, a propulsion unit including a power plant, and a propeller driven by said plant, means to mount said unit in said wing for swinging crosswise of the wing upwardly and downwardly, respectively, comprising a pair of trunnions upon opposite sides of the unit journaled in said wing, a pair of arcuate toothed tracks arching upwardly over said wing in spaced-apart parallel relation, a propeller drive shaft in said unit, a pair of stub shafts in said unit each geared to one of said tracks, gearing between said drive shaft and stub shafts for driving said stub shafts in opposite directions, relatively, and including a pair of shiftable gears, and means to shift said shiftable gears in unison.

3. In an aircraft having a wing, a propulsion unit including a power plant, and a propeller driven by said plant, means to mount said unit in said wing for swinging crosswise of the wing upwardly and downwardly, respectively, comprising a pair of trunnions upon opposite sides of the unit journaled in said wing, a pair of arcuate toothed tracks arching upwardly over said wing in spaced-apart parallel relation, a propeller drive shaft in said unit, a pair of stub shafts in said unit each geared to one of said tracks, gearing between said drive shaft and stub shafts for driving said stub shafts in opposite directions, relatively, and including a pair of shiftable gears, and means to shift said shiftable gears in unison comprising a rocker bar, and a pair of cables connected to opposite ends of said bar and extending out of one of said trunnions.

DANIEL BUNEVICH.